F. D. WARD.
GRAPHITE LUBRICATOR.
APPLICATION FILED MAR. 11, 1915.
1,177,910.
Patented Apr. 4, 1916.
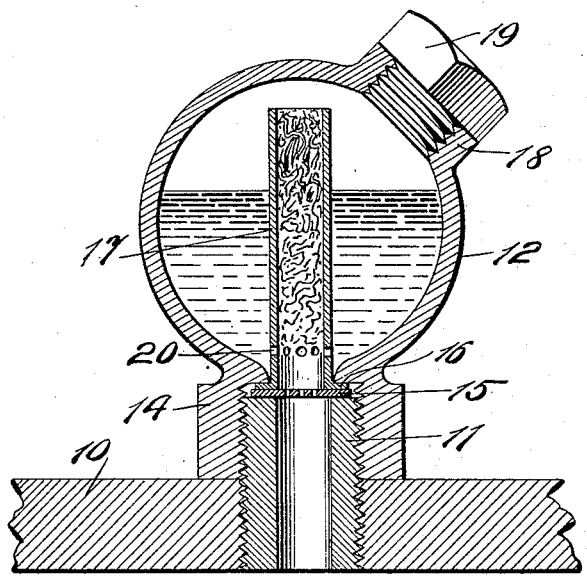
WITNESSES:
INVENTOR
Frank D. Ward
BY
ATTORNEY

UNITED STATES PATENT OFFICE.

FRANK D. WARD, OF NEW YORK, N. Y.

GRAPHITE LUBRICATOR.

1,177,910.      Specification of Letters Patent.      Patented Apr. 4, 1916.

Application filed March 11, 1915. Serial No. 13,607.

*To all whom it may concern:*

Be it known that I, FRANK D. WARD, a citizen of the United States, and a resident of the borough of Manhattan, city, county, and State of New York, have invented certain new and useful Improvements in Graphite Lubricators, of which the following is a description in such full, clear, and exact terms as will enable any person skilled in the art to which it pertains to make and use the same.

The invention relates to a lubricating device especially arranged with the graphite, though it may be employed with other solid or semi-solid lubricating substance. It is designed to feed by the fluctuations of pressure in the engine cylinder or other chamber to be lubricated.

The invention consists in certain special features of construction which will be fully set forth hereinafter and particularly pointed out in the claims.

The accompanying drawing represents a section of the lubricator showing it attached to the walls of the cylinder or other chamber to be lubricated.

Referring to the drawing: 10 indicates the wall of the cylinder to be lubricated in which is inserted a nipple 11, by means of which the body 12 of the lubricator is attached to the cylinder. This attachment is effected by screwing the chamber 12 onto the nipple 11, the chamber being provided with an internally threaded boss 14 for this purpose. Within the boss 14 is a foraminous brass plate 15 and the flange 16 of a tube 17. These are held tightly together by the nipple 11 and the tube 17 projects up to a point near the body or chamber 12. This body has a charging opening 18 closed by a screw threaded block 19. The tube 17 is open at the top and provided with orifices 20 at its lower end at the bottom of the chamber 12. Preferably the tube 17 is filled with mineral wool or some form of metal particles, though this is not strictly essential.

Within the cylinder 10 fluctuation of pressure necessarily results from the operations going on therein, whether these operations are those of a pump or of an engine or some other form of prime mover. These fluctuations are communicated through the tube 17 to the top of the chamber 12 and by reason of this pressure in the chamber the viscous lubricant is forced through the orifices 20 which communicate with the cylinder or other chamber 10. In this operation the tube 17 is important for its through this tube that the pressure is communicated and permitted to serve the function above described.

Having thus described my invention, what I claim as new and desire to secure by Letters Patent of the United States is:—

1. A graphite lubricator comprising walls forming a chamber, means for connecting it with parts to be lubricated, and a tube in the chamber, held by said connecting means and open at its outer end for the purpose specified and furnished with an orifice at its inner end for the movement of the lubricant, and a foraminous plate held at the base of the tube.

2. A graphite lubricator comprising walls forming a chamber with connection means to facilitate joining it to the cylinder or other device with which it is used and a tube furnished with a flange adapted to be clamped or held in said connection means to hold the tube in place, said tube furnishing a discharge for the lubricant.

3. A graphite lubricator comprising walls forming a chamber with connection means to facilitate joining it to the cylinder or other device with which it is used and a tube furnished with a flange adapted to be clamped or held in said connection means to hold the tube in place, said tube furnishing a discharge for the lubricant, and means for controlling the movement of the lubricant through the tube.

4. A graphite lubricator comprising walls forming a chamber with connection means to facilitate joining it to the cylinder or other device with which it is used and a tube furnishing a passage from the chamber to the cylinder or other part, the tube clamped between the said walls and the cylinder and furnished with means to control the passage of the lubricant.

In testimony whereof I have hereunto signed my name in the presence of two witnesses.

FRANK D. WARD.

Witnesses:
C. E. HUMPHREY,
A. L. MCCLINTOCK.

Copies of this patent may be obtained for five cents each, by addressing the "Commissioner of Patents, Washington, D. C."